Oct. 25, 1938.   W. GRUMBACHER   2,134,400
SPIRAL BINDING
Filed April 11, 1935   3 Sheets-Sheet 1
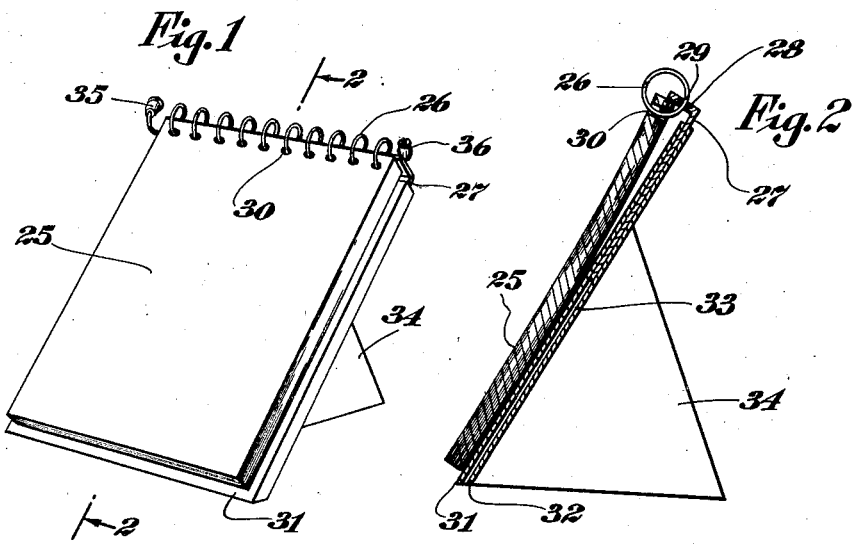
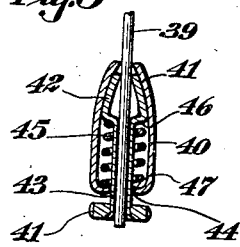
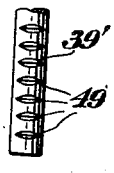
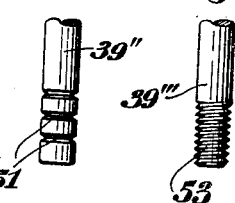
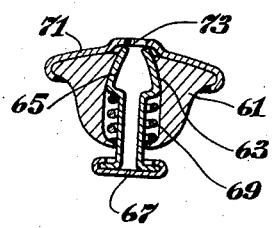
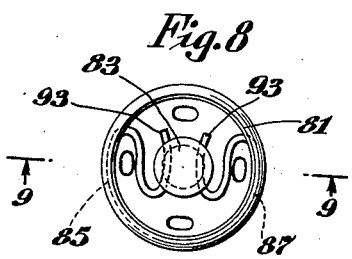
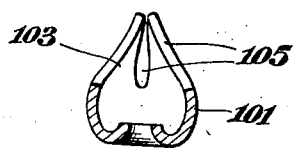
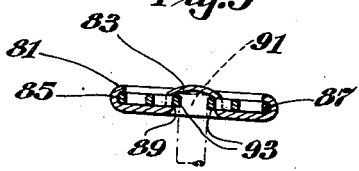
INVENTOR,
Walter Grumbacher;
BY
ATTORNEY.

Oct. 25, 1938. W. GRUMBACHER 2,134,400
SPIRAL BINDING
Filed April 11, 1935 3 Sheets-Sheet 2
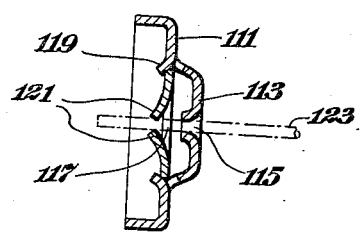
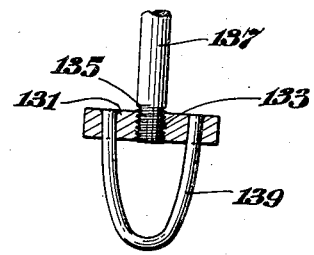
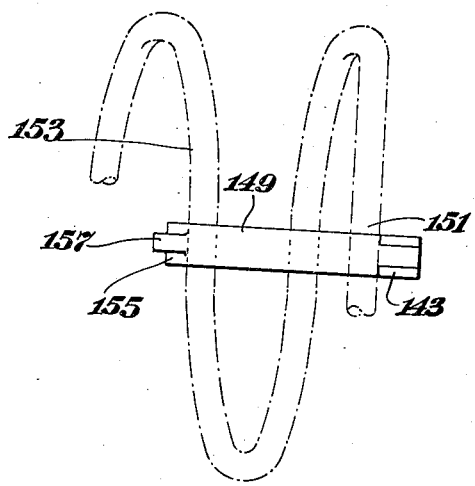
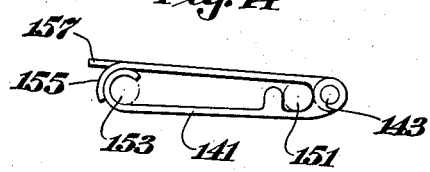
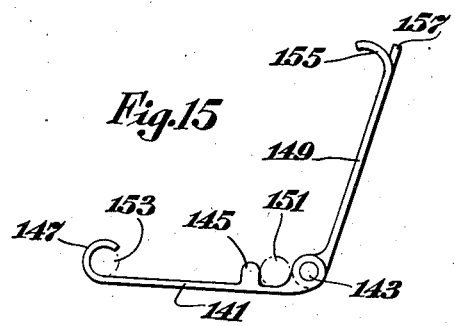
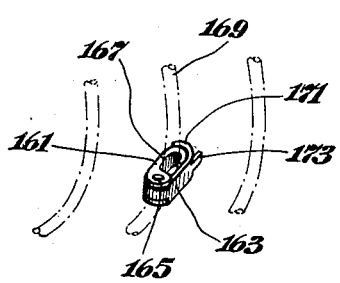
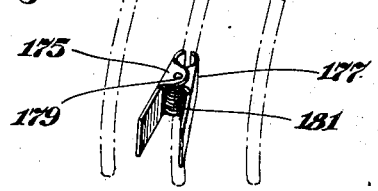
INVENTOR,
Walter Grumbacher,
BY
ATTORNEY.

Oct. 25, 1938.   W. GRUMBACHER   2,134,400
SPIRAL BINDING
Filed April 11, 1935    3 Sheets-Sheet 3
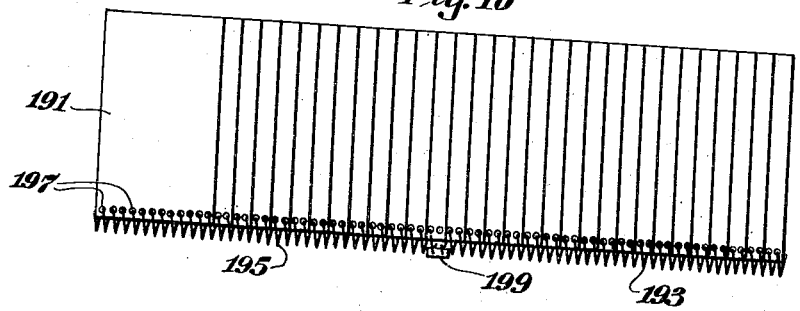
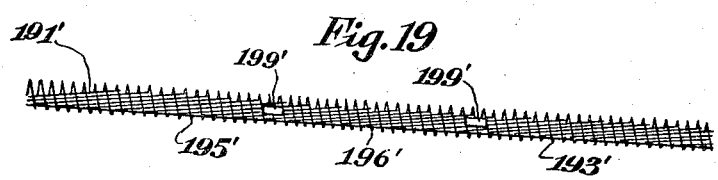
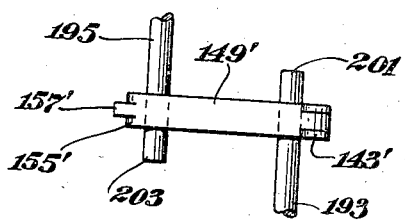
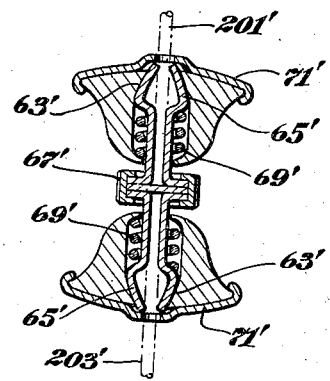
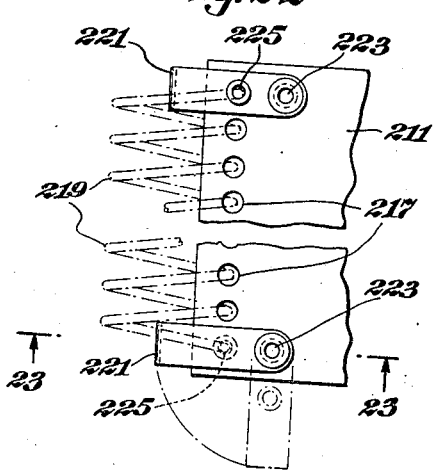
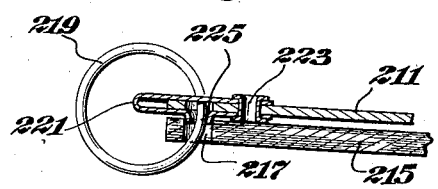
INVENTOR,
Walter Grumbacher,
BY
ATTORNEY.

Patented Oct. 25, 1938

2,134,400

UNITED STATES PATENT OFFICE 2,134,400

SPIRAL BINDING

Walter Grumbacher, New York, N. Y., assignor to Spiral Binding Co. Inc., New York, N. Y., a corporation of New York Application April 11, 1935, Serial No. 15,746

23 Claims. (Cl. 129—1)

This invention relates in general to the binding together of sheets of material and in particular to that type of binding known as "spiral bindings," and in one of its phases it relates to bindings of the type known as loose leaf bindings, that is bindings in which the sheets constituting the stack may be readily separated from the binding.

This application is a continuation in part of my copending application Serial Number 664,851, filed April 7, 1933, now Patent Number 2,051,477, Aug. 18, 1936.

In one of its aspects my invention deals with the construction of spiral binding elements and in the association of stop members therewith, such as may be applied to a spiral binding element to prevent its disassociation with the stack, and in particular to stop members such as may be readily removed from their association with the binding element and readily applied thereto, and whereby on effecting such removal the binding element may be disassociated from the stack, thereby releasing the sheets thereof, while when the stop member is applied, the sheets will be securely bound.

As to another aspect my invention relates to the assembly of sheets of material by means of spiral binding elements, in a manner that will enable convenient manipulation thereof.

Among the objects of my invention are therefore the provision of a spiral binding construction for sheets whereby the latter are readily accessible, and the provision of a construction in which a stop member is so associated with a spiral binding element that it may readily be removed therefrom and readily replaced thereon and one that will provide for the secure binding of a stack of sheets and will be pleasing in appearance so as not to detract from the commercial possibilities thereof.

For the attainment of these and other objects as will hereinafter appear or be pointed out I have disclosed several embodiments of my invention in the drawings in which:

Figure 1 is a view in perspective of a stack of sheeted material held together by a spiral binding element having end stops positioned thereon;

Figure 2 is a sectional view on the line 2—2 of Figure 1, looking in the direction of the arrows;

Figure 3 is a medial sectional view through a stop of the removable type in position on a wire such as a portion of a coil of a spiral binding element;

Figures 4, 5 and 6 are respectively detail views showing constructions adapted for the coils of the spiral binding element so as to make them more efficient in their cooperation with the removable stops;

Figure 7 is a medial sectional view of another form of removable stop;

Figure 8 is a plan view of a further modified form of removable stop;

Figure 9 is a sectional view on the line 9—9 of Figure 8, looking in the direction of the arrows;

Figures 10 and 11 are medial sectional views of further modified forms;

Figure 12 is a view of a form of stop requiring a threaded portion in the binding element;

Figure 13 is a plan view of another form of stop member applied to two adjacent coils of a spiral binding element;

Figure 14 is an end elevation of the stop member of Figure 12, the coils of the spiral element being shown in place therein;

Figure 15 is a view similar to that of Figure 13 with the stop member in open position;

Figure 16 shows in perspective, another form of stop adapted for application to an intermediate coil of a spiral element;

Figure 17 is a perspective view of still another form of stop adapted for application to an intermediate coil of a spiral element;

Figure 18 is a plan view showing a spiral binding for sheets in which two spirals are arranged in end to end relation;

Figure 19 shows, in elevation, an arrangement similar to that of Figure 18, but in which the binding is effected by three spirals in end to end relation;

Figure 20 illustrates the use of a stop element as in Figure 13, for connecting two spiral elements;

Figure 21 shows another form of stop element adapted for the interconnection of two spiral elements;

Figure 22 is a plan view of a portion of a stack of sheets with stop members for the spiral element carried by portions of the stack; and Figure 23 is a sectional view on the line 23—23 of Figure 22, looking in the direction of the arrows.

On referring to Figure 1 it will be observed that I there show a construction very suitable for calendars. A stack of sheets is bound by the spiral element 26 to a backing member 27. The latter has a portion 28 upstanding from the main body thereof, and this upstanding portion is perforated, as shown at 29, to accommodate the coils of the spiral element 26. Corresponding perforations 30 are provided in the stack 25, for the same purpose.

The stack 25 is shown as held in an inclined position, by a supporting member in the form of a stand comprising a member having spaced opposed walls 31, 32, into the space 33 between which the backing member 37 may be inserted. A bracket member, 34, applied to the back of member 32 serves to support the latter in the desired position.

In order to prevent disassociation of the spiral element 26 with the stack 25, stops 35 and 36 may be provided on the spiral element. These are shown in Figure 3 as applied to the ends of the spiral element and may both be of the removable type, although it will be obvious that in order to be able to remove the spiral element from the stack, it is sufficient if only one of them, say the stop 36, is removable. These stops perform their functions by reason of their size, which prevents their passage through the perforations 30.

While the stop members 35 and 36 are shown as applied to the ends of the spiral element, this is not necessarily so. For instance, a stop element might be applied to one of the intermediate coils, and if it is in such engagement therewith that it does not slip in relation to the spiral will act effectively to prevent disengagement thereof from the stack. Again, the stop element may be of a type engaging one or more coils intermediate or otherwise, and provide a bar between the perforations. These and other forms will be found among the stop members disclosed herein.

One form of stop member is shown in Figure 3. In this figure 39 indicates a portion of a spiral binding element on which the stop member is mounted. The latter comprises an outer body or shell 40 having openings at the ends thereof. The walls of the shell 40 are tapered, as shown at 41, so as to exert a camming action on the jaws 42 of an inner member 43, being adapted to pass through the opening 44 at one end of the shell 40 and to slide in relation to the shell. The jaws 42 are made of resilient material, and, as the member 43 is slid forward the jaws close, due to the camming action heretofore referred to. When the member 43, slides in the opposite direction, the jaws 42, due to their resiliency, open up. The member 43 has an opening therethrough, through which the portion 39 of the spiral may pass, and is also provided with a head 41 on its outer end. A compression spring 45, which may be of the coil type, is shown as acting between the shoulders 46 provided on the jaws 42, and the shoulders 47 on the shell 43, to cause the member 43 to move in such a direction that the jaws thereof tend to close. As a result of this construction, when the coil portion 39 is inserted therethrough, the jaws 42 will close thereon and hold it in place in relation to the shell 40. In order to effect disengagement of the jaws, the head 41 is moved away from the shell 40, in which event the jaws 42, being no longer subjected to the camming effect of the walls 41, are free to open. The movement of the head 41 in relation to the shell 40, where the stop element is a small one, is readily effected by inserting a finger-nail between head 41 and shell 40.

In order to secure a better gripping action in a stop member, such as the one shown in Figure 3, the spiral element may have its surface modified in various ways such as those shown in Figures 4, 5 and 6. In Figure 4 a spiral element 39' has a series of transverse notches 49 applied to the surface thereof. It is to be understood that these notches may be arranged around the circumference of the surface of 39". It will be obvious that when the jaws 42 of the stop member of Figure 2 grip the spiral element 39' that the gripping action thereof will be greatly enhanced and sliding prevented.

In the form shown in Figure 5 the spiral binding element portion 39" has a series of annular grooves 51 applied to its surface. The effect will obviously be similar to that mentioned in relation to the construction of Figure 4.

In Figure 6 the binding element member 39''' has a screw thread 53 formed thereon. When the jaws 42 engage the threaded portion 53, the effect will be similar to that of the construction shown in Figure 5. Disengagement of the stop member may be effected either by releasing the jaws 43 in relation to the member 39''', or by turning it in relation thereto, whereby the stop member will be unscrewed due to the screw thread and nut action between the jaws 43 and thread 53.

It is to be understood that while I have described the spiral element construction of Figures 4, 5 and 6 in relation to the stop member of Figure 3, that the same may be effectively used in combination with other forms of stop elements that depend for their action on a gripping engagement of the surface of the binding element.

In Figure 7 a form of stop member is shown which is similar to that of Figure 3 in that it has a body member 61, having a central bore provided with camming surfaces 63 adapted to engage the jaws 65 of the inner sliding member 67. A spring 69, engaging suitable shoulders on the jaws and on the member 61, forces the jaws 65 against the cam surfaces 63 so as to cause them to grip a spiral element inserted between the jaws. The cap member 71 is carried by the body 61, and is provided with an opening 73 through which the element to be gripped is inserted, and by which it is guided.

It will be observed that the member 67 is closed at one end so that this member is adapted for use only on the end of a spiral binding element. This end is inserted through the opening 73 and through the jaws 63 and is brought to a stop at the bottom of the member 67. This construction therefore differs from that of Figure 3 in that in the latter the binding element passes completely through the same for which reason this stop may be slid over intermediate portions of the binding element instead of being restricted merely to application over the end portion.

Figures 8 and 9 show another form of stop member adapted for use on the end of a binding element. This stop member is shown as comprising a shell 81 of generally disc-shaped conformation, having a central raised portion 83, and a rim 85 contoured so as to form a channel within which is held a spring 87, having the portions 93 adjacent the free ends thereof adapted to pass through slots 89 applied in the sides of the raised portion 83, so as to grip the end 91 of a spiral binding element (shown in dotted lines) inserted into the hollow of the raised portion 83. In order to give the necessary resiliency to the spring 87, the same is shown as of a contour, adapted to secure this result. This contour, selected by way of illustration, has the effect of lengthening the effective resilient portion, while confining the spring to a limited area.

In Figure 10 is shown a stop member in the form of a pear shaped body 101 having an opening therethrough for inserting the spiral binding element, and formed into resilient jaws 103 by slits 105 at one end serving to grip a spiral binding member inserted therebetween.

In Figure 11 is shown, in section, a disc shaped member 111 having a central raised portion 113 with an opening 115 therein. A plate 117 is held in place above the raised portion 113 in any suitable way, as by lugs 119, struck up from the member 111, and this plate is provided with resilient jaws 121 adapted to grip a spiral binding element, such as is indicated by dotted lines 123, inserted thereinto.

As to the constructions of Figures 8 to 11 inclusive it will be observed that the gripping action thereof cannot be controlled positively in any way as can the gripping action of those of Figures 2 and 6. It is therefore obvious that when these forms are used there is apt to be considerable wear on the surfaces of the spiral binding element as these stop members are slid in relation thereto. This is particularly true where the surfaces of the binding elements are constructed as shown in Figures 4, 5 and 6, since the jaws of the locking members catch in the grooves and greater abrasion results when it is attempted to disengage them.

In Figure 12 is shown a disc shaped stop member 131 provided with an internal thread 133 adapted to screw on the threaded portion 135 of the end of a spiral member 137. For convenience in manipulation, since these parts are usually very small, a U shaped member 139 may be attached to the member 131 as shown, although it is not necessary for the proper functioning of the device.

This form is obviously most useful at the extreme end portions of a spiral binding element, as otherwise a long threaded portion would be required, which, besides being more expensive to manufacture, would weaken the binding element to a considerable extent and would be more readily damaged during use. Where the U shaped member 139 is used, it would limit the length of the useful threaded portions, since it would act as a stop tending to determine the distance that the member 131 could be screwed on the binding element.

The forms so far described depend for their stop action on the fact that they are too large to pass through the perforations of the stack. The next form to be described is one in which an abutment is used that strikes against the material of the stack between the perforations when it is attemped to remove the spiral by unwinding it.

In Figures 13, 14 and 15 is shown a stop member in the form of a pair of jaws hinged together and having recessed portions therein which are adapted to engage the adjacent coils of a spiral binding element. One of the jaws is indicated at 141 and is shown as provided with a hinge carrying extension 143 and a projecting lug 145, between which sufficient space is left to receive a portion of a coil 151 of the binding element. The opposite end 147 of the jaw 141 is shown as bent backwardly so as to provide a recess for the reception of a portion of another coil 153 of a spiral binding element. The jaw 149 is hinged to the jaw 141 in opposed relation thereto and is provided with a bent extension 155 adapted to resiliently engage the portion 147 of the jaw 141 and to thereby lock the two jaws together, and is also provided with a projection 157 which affords a convenient hold for the fingers of a manipulator to effect separation of the jaws.

In order to make the stop member effective the recesses receiving the coils 151 and 153 should be so proportioned in relation to the coils that they will receive the same with a gripping action and furthermore the spacing between the coil receiving recesses may be such that the coils are sprung out of their normal pitch so as to be held in the recess in resilient tension, where a resilient binding element is used. The jaw 149 may further be proportioned so as to grip the coil portion 151 when it is in its closed position.

It will be obvious that the coils to which the stop members of Figures 13, 14 and 15 may be applied, may be located at any intermediate portion of the spiral binding element, or may be located at the end portions thereof. It will furthermore be obvious that the coils engaged by the stop member need not necessarily be adjacent, but that they may be spaced from each other. In an extreme case, the stop member may even be designed to engage the two opposed end coils of the spiral element.

In Figure 16 is shown a stop member similar to that shown in Figures 13, 14 and 15, but adapted to receive only one coil of the binding element. In this figure, 161 and 163 are a pair of jaws, hinged together at 165, and the jaw 161 has a recess 167 adapted to receive a coil 169 of a spiral binding element. The jaw 163 has a portion 171 thereof engaging the jaw 161 in overlapping resilient relation, and also has a projecting lug 173 to provide for convenient manipulation in opening the jaws. The parts are so proportioned that when the jaws are in closed position they grip the coil 169 sufficiently to hold it against sliding displacement which may result from ordinary handling.

As to this form of stop member, as well as that of Figure 13, it will be observed that they may be applied to intermediate coils of the spiral binding element and it will be observed that only one stop member, if applied on an intermediate coil, will effect the function of two stop members, applied one at each end.

It will of course be understood that instead of the hinge construction shown as uniting the jaws of the stop members of Figures 13 and 16, other constructions may be used. For instance, both jaws might be formed from a single piece of resilient material, sufficiently yieldable to provide for the hinge action.

In Figure 17 I have shown another form of stop that may be applied to an intermediate part of the binding element. This stop is shown as comprising a pair of jaws 175 and 177 hinged together as by a pintle 179. The jaws are forced into closing position by a spring 181, which is shown as of the torsion type, although obviously it may be of other types.

In Figures 18 and 19 I have shown constructions involving the use of a plurality of spiral binding elements.

The construction shown in Figure 18 comprises a number of sheets 191 arranged in staggered overlapping relation, and bound together along one edge thereof by spiral elements 193 and 195 passing through perforations 197 in the sheets 191. It will be obvious that this construction is particularly adapted for card index systems of the "visible" type and provides for ready visibility of the indicia applied to the exposed portions of the cards, so that any card may be readily located, and also assures ready accessibility of the cards for inspection.

By providing two spiral elements great convenience is gained if it is desired to remove individual cards. For example, it may be desired to remove the card at the extreme left end of the stack. This may be done by moving the spiral 195 without disturbing the spiral 193 of the cards associated therewith. Spiral 195 may be unwound toward the left, or it may be wound toward the right, passing into the same holes already occupied by the spiral 193, these being made sufficiently large for that purpose.

If the middle card of the stack is to be removed, it is necessary to move both spirals 193 and 195, but this need be done only for a small distance. If a single spiral were used, it would have to be unwound for a distance greater than half the length of the stack. The great advantage of the two spiral construction, particularly where the row of cards is long, will be obvious in this instance.

Obviously the plural binding element is not necessarily restricted to the staggered arrangement, but is also conveniently used in connection with ordinary stacks.

In order to lock the spiral binding elements in place, I have indicated, symbolically, a stop member 199 which serves to interconnect the spiral elements 193 and 195, and at the same time to prevent disassociation of these elements from the stack.

The element 199 may be of the form shown in Figure 13, that is, one which bridges two coils. Such an element is indicated in Figure 20, in which 149' indicates one jaw of a stop member such as that of Figure 13, provided with the clamping portion 155' and the releasing lug 157'. The numeral 201 indicates the end of one coil of a spiral element such as 193, and the numeral 203 indicates the oppositely directed end of a coil belonging to another spiral element, such as 195.

While I have shown one connecting element 199 as interconnecting the spirals 195 and 193 it will be obvious that many other arrangements might be used. For instance each one of these spirals might be provided with an individual stop (for example of the type shown in Figure 3 or 7) at its inner end, with the same effect, or again an intermediate stop (as in Figure 13, 16 or 17) might be used on an intermediate coil. These examples indicate a few of the possibilities.

In Figure 19 I show a stack 191' similar to the stack 191 of Figure 18, but instead of two spirals, I have indicated the use of more than two spirals, the particular number shown being three, although obviously any desired number may be used. The spirals are denoted in the drawings by 193', 195' and 196', and the stop elements, shown by way of example as of the interconnecting type (as in Figure 20), are denoted by 199'. Here again, it is obvious that other stop arrangements may be used with like effect.

Instead of coupling the coils as shown in Figure 20, that is, one in which the coupled coils lie side by side, the ends of the coils may be united in end to end relation as shown in Figure 21, by the arrangement such as there shown, by way of example. This arrangement involves merely an end to end duplication of the parts of Figure 7. In view of the complete description of the construction of Figure 7 further description of this stop member is believed to be unnecessary. It need merely be stated that corresponding parts of Figure 21 have been given the same numerals as Figure 7 with the addition of priming. The ends of the respective coils have been denoted by 201' and 203'.

In Figures 22 and 23 is shown a construction in which the purpose is to prevent movement of the spiral after it is in place, by means other than stops applied to the spiral, and for this purpose I have shown, by way of example, stop members adapted to obstruct the perforations of the stack so that the spiral cannot pass therethrough, and the stop members are applied to portions of the stack, and not to the spiral binding element. By referring to these figures it will be observed that the stack 215 shown therein is provided with a cover member 211. Perforations 217 pass through all the sheets of the stack and the cover, and a spiral binding element 219 is threaded through the perforations. A stop member 221 is shown as carried on each corner portion of the cover member 211 adjacent to the ends of the spiral binding element. Each stop element 221 may consist of a strap or band of any suitable or preferred material, such as metal, doubled over into U conformation so as to engage opposed surfaces of the cover 211. At 223 it is shown as provided with a pivotal member that passes through the cover and unites the two legs of the stop member and serves to lock the stop member 221 in place on the cover 211, without however preventing pivotal movement of the member 211, so that it may assume the full line position in which it obstructs the end perforations or swing into a position such as the dotted line position, in which it clears the end perforation. Stop member 221 is furthermore shown as perforated at 225, at a point registering with the end perforations 217 of the cover and stack when the stop member is in the aforementioned full-line position. It will however be observed that only one leg of the stop member 221 is so perforated and that the outer or upper leg is not perforated, so that when the stop member assumes the aforementioned full line position of Figure 22, the outer leg thereof serves to obstruct the end perforations 217. When the stop member is in this position, it is only necessary to insert the end of the spiral element 219 into the perforation 225 to effect a locking of the spiral in one direction of motion. By having a similar stop member at the other end of the spiral, said other end may be locked in the opposed direction of motion, so that, with the aid of these stop members, the spiral may be completely locked. Obviously use may be made of the resilient properties of a resilient spiral element, in order to avoid motion between the stop member and the spiral element, and the effectiveness of the construction may be still further enhanced by distorting the spiral 219 under resilient tension so as to uncoil it, while the stop member is placed into the aforementioned full line position. On releasing the spiral and guiding its end into the perforations 225 the spiral will be securely locked in place under resilient tension.

It is to be understood that the stop just described is illustrative of a great variety of constructions embodying obstruction of the perforations of the stack. I may mention one form in which the stop might be hinged to the cover, in lid fashion, so as to cover the perforations when lowered, and clear it when raised.

Another class of stops, also associated with the cover would make use of the principle of locking a portion of the spiral to a portion of the stack.

For example, the member 221 might be made yieldable and resilient. If now the appropriately bent end of the member 219 is inserted between the member 221 and the cover 211 it will be held there. To accomplish this function the member 221 need not have any pivotal movement, so long as a part thereof may be raised for the insertion and clamping therebeneath of a portion of the spiral.

Still other embodiments of this idea may employ any member carried by the stack and engaging any portion of the spiral, not necessarily an end portion.

While I have herein described several embodiments of my invention it will be obvious that the same may be embodied in other forms as will be obvious to those skilled in the art, without departing from the spirit thereof as defined in the appended claims.

Having thus described my invention and illustrated its use, what I claim as new and desire to secure by Letters Patent, is:

1. A spiral binding construction comprising a stack of sheets, the sheets of said stack having registering perforations along one edge thereof, a spiral binding element threaded turn for turn through said perforations, and means carried by one of the sheets of the stack and adapted to be positioned so as to obstruct the passage of the spiral through one of the perforations of said sheet.

2. A spiral binding construction comprising a stack of sheets, the sheets of said stack having registering perforations along one edge thereof, a spiral binding element threaded turn for turn through said perforations, and means adapted to be positioned so as to prevent the passage of the spiral through one of said registering perforations, said means being pivotally carried by one of the sheets of said stack.

3. In a spiral binding construction, a stack of sheets having a row of perforations adjacent one edge thereof, a plurality of spiral binding elements each threaded through some of said perforations so as to assume an end to end relation, a connecting member associated with the adjacent portions of said spiral binding elements so as to unite them, and adapted when in such position to prevent disassociation of said spiral binding elements from the stack.

4. For use in a spiral binding construction, in combination, a spiral binding element having portions of the surface thereof roughened, and a member adapted to prevent the passage of the spiral element through the perforations of a stack with which it is associated and having resilient portions thereof adapted to press against said roughened portions.

5. In a spiral binding construction, a spiral binding element adapted to be threaded through uniformly spaced perforations provided in a stack of sheets and having portions of the surface thereof provided with grooves, and a removable member having resilient portions adapted to press against said grooves, and when so functioning to prevent the passage of the spiral element through the perforations of said stack.

6. For use in a spiral binding construction, a spiral binding element having portions of the surface thereof provided with transverse grooves.

7. In a spiral binding construction for a stack of sheets provided with perforations, a spiral binding element threaded through the perforations in said stack, and stop means adapted for engagement with said spiral element for preventing its removal from the stack of sheets, said means having resilient portions thereon adapted to press against portions of said binding element, and being adapted for ready application to and ready removal from such position of engagement.

8. In a spiral binding construction for a stack of sheets provided with perforations, a spiral binding element threaded through the perforations in said stack, and stop means adapted for engagement with said spiral element for preventing its removal from the stack of sheets, said means having resilient portions thereon adapted to press against portions of said binding element.

9. In a spiral binding construction for a stack of sheets provided with perforations, a spiral binding element threaded through the perforations in said stack, and stop means adapted for engagement with said spiral binding element for preventing its removal from the stack of sheets, said means being provided with jaws adapted to grip said spiral binding element.

10. For use in a spiral binding construction, a stack of sheets, the sheets of which have registering perforations therein, adapted for the reception therethrough, in threaded relation, of a spiral binding element and movable means carried by one of the sheets of said stack and adapted to be moved into a position in which it obstructs at least one of the perforations of said sheet so as to prevent the passage therethrough of said spiral binding element.

11. For use with a spiral binding construction in which a stack of sheets is bound together by a pair of spiral binding elements positioned in end to end relation, and each threaded through some of the perforations in the stack, a connecting member adapted to connect said spiral binding elements together, said member being of such conformation that it cannot pass through the perforations in the stack.

12. For use with a spiral binding construction in which a stack of perforated sheets is bound together by a pair of spiral binding elements each threaded through some of the perforations of said stack, a removable connecting member adapted to connect said spiral binding elements together, said member being of such conformation that it cannot pass through the perforations in the stack.

13. For use in uniting a stack of perforated sheets, a spiral binding element adapted to be threaded through the perforations of said stack in combination with a member adapted for clamping to two coils of said spiral binding element.

14. For use in uniting a stack of perforated sheets, a spiral binding element adapted to be threaded through the perforations of said stack in combination with a member adapted for direct attachment to said spiral element at an intermediate portion thereof and without passing over the end thereof, said member comprising jaws adapted to receive a portion of said spiral element therebetween, said member being of such conformation that it will not pass through the perforations of the stack, whereby it will prevent disassociation of said spiral from said stack.

15. For use in uniting a stack of perforated sheets, a spiral binding element adapted to be threaded through the perforations of said stack in combination with a member adapted for direct attachment to said spiral element at an intermediate portion thereof and without passing over the end thereof, said member comprising resilient jaws adapted to receive a portion of said spiral element therebetween, said member being of such conformation that it will not pass through the perforations of the stack, whereby it will prevent disassociation of said spiral from said stack.

16. In a spiral binding construction, a stack of sheets having perforations therein, a plurality of spiral binding elements each threaded through some of said perforations in end to end relation, a connecting member associated with portions of each pair of said spiral binding elements so as to unite them, and adapted when so applied to prevent disassociation of said spiral binding elements from the stack, said member being adapted for connecting portions of said spiral elements removed from the end portions thereof, and without engaging the end portions thereof.

17. In a spiral binding construction, a stack of sheets having a row of perforations adjacent one edge thereof, a plurality of spiral binding elements each threaded through some of said perforations so that the spiral elements are aligned in end to end relation, a connecting member associated with portions of said spiral binding elements so as to unite them, and adapted when in such position to prevent disassociation of said spiral binding elements from the stack, said members being adapted for connecting portions of said spiral elements removed from their end portions, and without engaging the end portions thereof.

18. For use with a pair of spiral binding elements for uniting a stack of perforated sheets, a stop member for preventing disassociation of said spiral binding elements from the perforations of said stack, said member comprising openings adapted to receive the ends of said spirals and also comprising retaining means adapted to engage the end portions of said spiral binding elements and to retain them within said openings.

19. For use with a pair of aligned spiral binding elements for uniting a stack of perforated sheets, a stop member for preventing disassociation of said spiral binding elements from the perforations of said stack, comprising openings adapted to receive the ends of said spirals and also comprising retaining means adapted to engage the end portions of said spiral binding elements and to retain them within said openings.

20. In combination with a stack of perforated sheets adapted to receive through the perforations thereof a plurality of spiral binding elements positioned in end to end relation, each being threaded through some of said perforations, a connecting element provided with aligned openings adapted to receive an end portion of each spiral of a pair of contiguous spirals, said connecting element being of such form that it will not pass through said perforations.

21. A spiral binding construction comprising a stack of sheets the sheets of said stack having registering perforations along one edge thereof adapted to receive a spiral binding element threaded therethrough, and means adapted to be positioned so as to prevent the passage of portions of the spiral through one of said perforations, said means being in the form of a U-shaped member pivotally connected to one of the sheets of said stack at the open end of said U, and one of the legs of said member having a perforation therein adapted to register with the perforations of the stack, and adapted to receive the end of a spiral binding element threaded through the stack, and the other leg of said member being unperforated, whereby, when said perforation of the member is aligned with a perforation of the stack and the end of said spiral binding element is inserted into said registering perforations of said stack and said member, it will pass thereinto but will be prevented from emerging on the other side by the unperforated leg of said member, and whereby turning of said spiral element in one direction will be prevented.

22. For use with a binding construction in which a stack of sheets is bound together by a spiral binding element passing through perforations in the stack, the combination of a spiral binding element having the coils thereof pitched so that they may be threaded through the perforations of the stack, and an element of such a size that it cannot pass through the perforations of the stack, removably positioned on only a limited portion of only one turn of the binding element.

23. For use in a spiral binding construction, a spiral binding element having at least one end thereof provided with screw threads adapted for the reception of a complementarily threaded member.

WALTER GRUMBACHER.